(12) United States Patent
Sharma et al.

(10) Patent No.: US 11,780,371 B2
(45) Date of Patent: Oct. 10, 2023

(54) AUTO PANNING CAMERA MIRROR SYSTEM INCLUDING WEIGHTED TRAILER ANGLE ESTIMATION

(71) Applicant: Stoneridge, Inc., Novi, MI (US)

(72) Inventors: Utkarsh Sharma, Troy, MI (US); Liang Ma, Rochester, MI (US); Troy Otis Cooprider, White Lake, MI (US)

(73) Assignee: Stoneridge, Inc., Novi, MI (US)

( * ) Notice: Subject to any disclaimer, the term of this patent is extended or adjusted under 35 U.S.C. 154(b) by 0 days.

(21) Appl. No.: 17/723,775

(22) Filed: Apr. 19, 2022

(65) Prior Publication Data

US 2022/0396209 A1  Dec. 15, 2022

Related U.S. Application Data

(60) Provisional application No. 63/209,006, filed on Jun. 10, 2021.

(51) Int. Cl.
*B60R 1/26* (2022.01)
*G06V 20/58* (2022.01)
*G06V 10/80* (2022.01)
*B60R 1/00* (2022.01)
(Continued)

(52) U.S. Cl.
CPC ............... *B60R 1/26* (2022.01); *B60R 1/002* (2013.01); *G06V 10/803* (2022.01); *G06V 20/58* (2022.01); *H04N 23/695* (2023.01); *B60R 2001/1215* (2013.01); *B60R 2001/1253* (2013.01); *B60R 2300/30* (2013.01); *B60R 2300/80* (2013.01)

(58) Field of Classification Search
CPC ...... B62D 15/021; B62D 53/00; G06V 10/30; G06V 20/58; B60R 2300/808; B60R 2001/1253; B60R 11/04; B60R 1/26; B60R 1/003; B60R 16/0232; B60R 1/25; B60R 1/28; B60R 1/27; B60R 2001/1215; B60R 2300/101; B60R 2300/8093; B60R 1/00; B60R 2300/806; B60R 2300/8046; B60R 2300/804; B60R 1/002; B60T 8/1708; H04N 23/695; H04N 23/69; B60D 1/245
USPC ..... 348/148, 843; 280/204, 292, 423.1, 432, 280/442
See application file for complete search history.

(56) References Cited

U.S. PATENT DOCUMENTS

| 9,610,975 | B1* | 4/2017 | Hu ........................... B60D 1/06 |
| 2015/0002670 | A1 | 1/2015 | Bajpai |
| 2017/0174130 | A1* | 6/2017 | Hu ........................... B60C 5/00 |

(Continued)

FOREIGN PATENT DOCUMENTS

EP   4070996 A1   10/2022

OTHER PUBLICATIONS

European Search Report for Application No. 22171931.3 completed on Oct. 26, 2022.

*Primary Examiner* — Nathnael Aynalem
(74) *Attorney, Agent, or Firm* — Carlson, Gaskey & Olds, P.C.

(57) ABSTRACT

A method for automatically panning a view for a commercial vehicle includes determining a plurality of estimated trailer angles. Each estimated trailer angle is determined using a distinct estimation method, and method assigns a confidence value to each estimated trailer angle in the plurality of estimated trailer angles. The method determines a weighted sum of the plurality of estimate trailer angles, and automatically pans the view based at least in part on the weighted sum and a current vehicle operation.

18 Claims, 6 Drawing Sheets

(51) Int. Cl.
*H04N 23/695* (2023.01)
*B60R 1/12* (2006.01)

(56) References Cited

U.S. PATENT DOCUMENTS

| | | | |
|---|---|---|---|
| 2019/0016264 A1 | 1/2019 | Potnis et al. | |
| 2019/0118859 A1* | 4/2019 | Ghannam | B62D 6/005 |
| 2022/0314881 A1* | 10/2022 | Gudarzi | H04N 7/181 |
| 2022/0346581 A1 | 11/2022 | Lawson et al. | |

* cited by examiner

AUTO PANNING CAMERA MIRROR SYSTEM INCLUDING WEIGHTED TRAILER ANGLE ESTIMATION

CROSS-REFERENCE TO RELATED APPLICATION

This application claims priority to U.S. Provisional Patent Application No. 63/209,006 filed on Jun. 10, 2021.

TECHNICAL FIELD

This disclosure relates to a camera mirror system (CMS) for use in a commercial truck, and in particular to a CMS having an auto-panning feature including fused trailer angle estimates.

BACKGROUND

Mirror replacement systems, and camera systems for supplementing mirror views, are utilized in commercial vehicles to enhance the ability of a vehicle operator to see a surrounding environment. Camera mirror systems (CMS) utilize one or more cameras to provide an enhanced field of view to a vehicle operator. In some examples, the mirror replacement systems cover a larger field of view than a conventional mirror, or include views that are not fully obtainable via a conventional mirror.

In certain operations, such as trailer reversing maneuvers, stationary views such as those provided by a fixed mirror or a fixed field of view camera may not provide a full view of the operation and desirable information that could be presented to the operator is not presented to the operator. Manual panning systems, where the operator manually adjusts a physical camera or mirror angle can require frequent stopping of the maneuver to adjust the view provided and can provide insufficient granularity to the adjustments.

Some example systems attempt to minimize the issues with manual panning by implementing automatic or semi-automatic panning. Such systems rely on estimates of trailer angle that are potentially inaccurate and the kinematic models of vehicle operations, particularly in reversing operations, can have a difficult time accounting for the potential variability of the trailer angle estimates.

SUMMARY OF THE INVENTION

An exemplary method for automatically panning a view for a commercial vehicle includes determining a plurality of estimated trailer angles, each estimated trailer angle being determined using a distinct estimation method, assigning a confidence value to each estimated trailer angle in the plurality of estimated trailer angles, determining a weighted sum of the plurality of estimate trailer angles, and automatically panning the view based at least in part on the weighted sum and a current vehicle operation.

Another example of the above described method for automatically panning a view for commercial vehicles further includes adding the determined weighted sum to an ordered list of historical weighted sums and low pass filtering the ordered list.

In another example of any of the above methods for automatically panning a view for a commercial vehicle automatically panning the view is based on the filtered ordered list.

Another example of any of the above methods for automatically panning a view for a commercial vehicle further includes discarding any estimated trailer angles with a confidence value below a predetermined threshold after assigning the confidence value to each estimate trailer angle and before determining the weighted sum.

In another example of any of the above methods for automatically panning a view for a commercial vehicle the predetermined threshold is at least 85%.

In another example of any of the above methods for automatically panning a view for a commercial vehicle the weighted sum is determined by multiplying each trailer angle estimate by the corresponding confidence value to determine weighted estimates, summing the weighted estimates, and dividing the summed weighted estimates by a sum of the confidence values.

In another example of any of the above methods for automatically panning a view for a commercial vehicle the distinct estimation methods include at least two of an image-based wheel detection, an image-based trailer rear edge angle detection, an image-based trailer marking angle detection, an image based wheel angle detection, a road edge deviation detection, a lane marker deviation detection, a hitch angle sensor, and a wheel angle sensor.

In another example of any of the above methods for automatically panning a view for a commercial vehicle automatically panning the view comprises adjusting a class II view within a class IV view.

In another example of any of the above methods for automatically panning a view for a commercial vehicle automatically panning the view comprises maintaining a rear edge of the trailer within the class II view.

Another example of any of the above methods for automatically panning a view for a commercial vehicle further includes continuously iterating the method, thereby generating real time trailer angle monitoring.

In another example of any of the above methods for automatically panning a view for a commercial vehicle determining the plurality of estimated trailer angles, assigning the confidence value to each estimated trailer angle in the plurality of estimated trailer angles, and determining a weighted average of the plurality of estimated trailer angles is performed within a camera mirror system controller of the vehicle.

In another example of any of the above methods for automatically panning a view for a commercial vehicle at least one of determining the plurality of estimated trailer angles, assigning the confidence value to each estimated trailer angle in the plurality of estimated trailer angles, and determining a weighted average of the plurality of estimated trailer angles is performed remote from a camera mirror system controller and transmitted to the camera mirror system controller.

In one exemplary embodiment a camera mirror system for a vehicle includes a first camera having a first field of view, a controller configured to receive the first field of view and output a subset of the first field of view to a first display, the controller including a trailer angle detection module configured to determine a plurality of trailer angle estimates, a confidence value module configured to determine a confidence value of each trailer angle estimate, and a fusion module configured to fuse the plurality of trailer angle estimates and the confidence values into a single trailer angle estimate, and automatically panning at least one view of the camera mirror system based at least in part on the single trailer angle estimate such that a feature of the trailer is maintained within the at least one view.

In another example of the above described camera mirror system for a vehicle the fusion module is configured to determine a weighted sum trailer angle based on the plurality of trailer angle estimates and the corresponding confidence values.

In another example of any of the above described camera mirror systems for a vehicle the fusion module is further configured to add the weighted sum trailer angle to a historical weighted sum trailer angle data set and low pass filter the historical weighted sum trailer angle data set.

In another example of any of the above described camera mirror systems for a vehicle each trailer angle estimate in the plurality of trailer angle estimates is determined via a distinct angle estimation method.

In another example of any of the above described camera mirror systems for a vehicle the controller is further configured to add the single trailer estimate to an ordered list of historical trailer angle estimates and low pass filter the ordered list.

In another example of any of the above described camera mirror systems for a vehicle the automatic panning is based at least in part on the low pass filtered ordered list.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
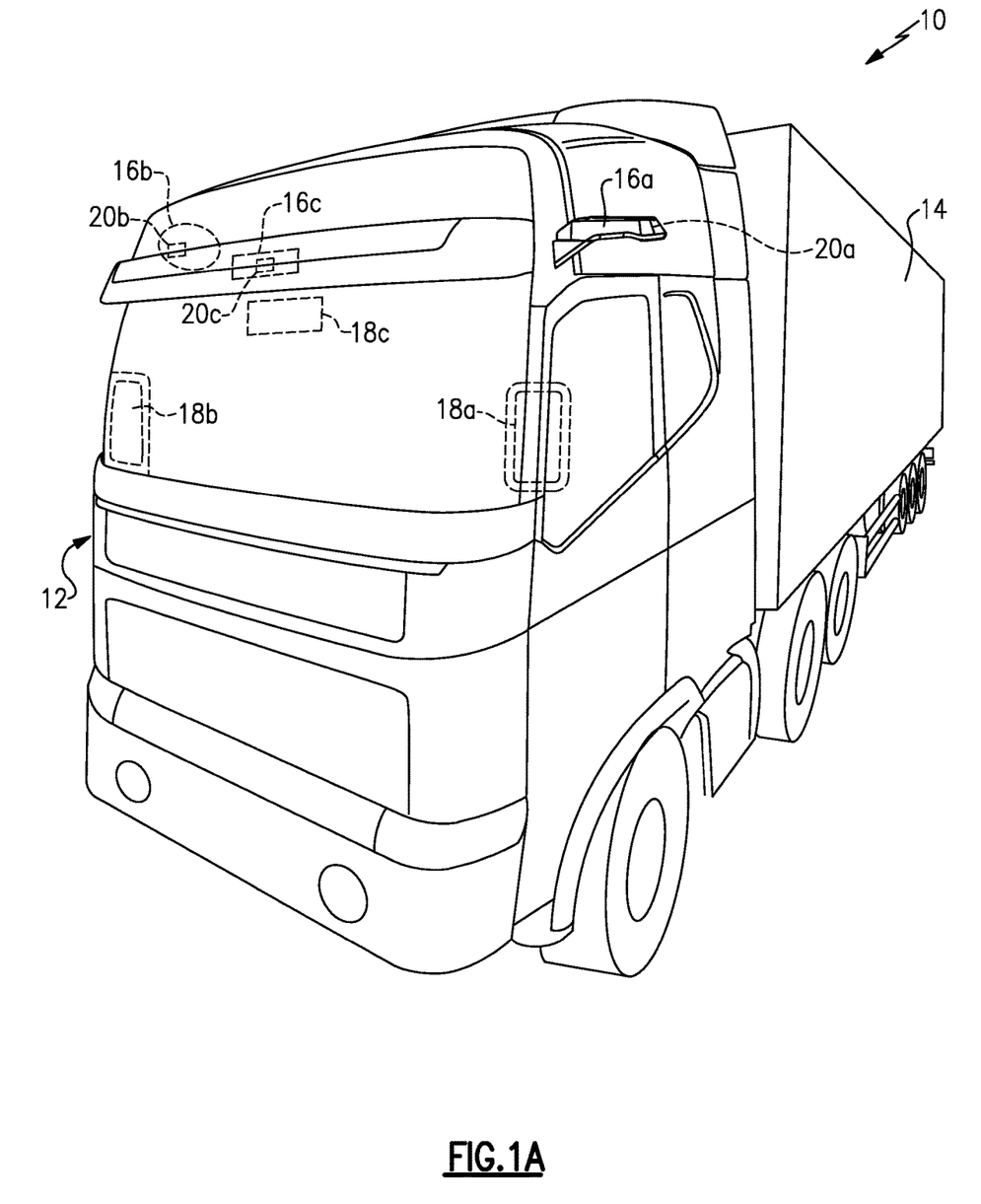
FIG. 1A is a schematic front view of a commercial truck with a camera mirror system (CMS) used to provide at least Class II and Class IV views.
Figure 1B:
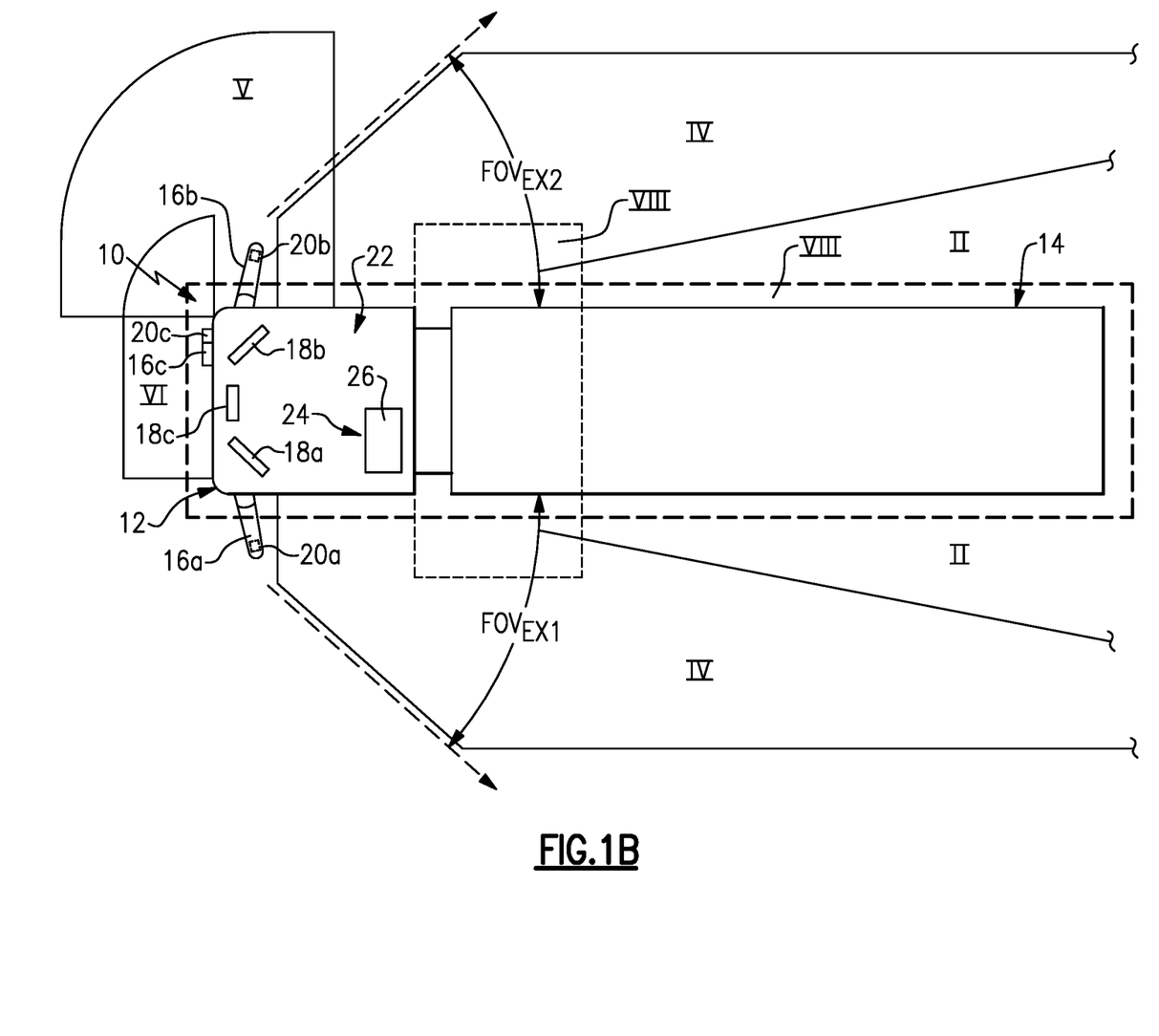
FIG. 1B is a schematic top elevational view of a commercial truck with a camera mirror system providing Class II, Class IV, Class V and Class VI views.
Figure 2:
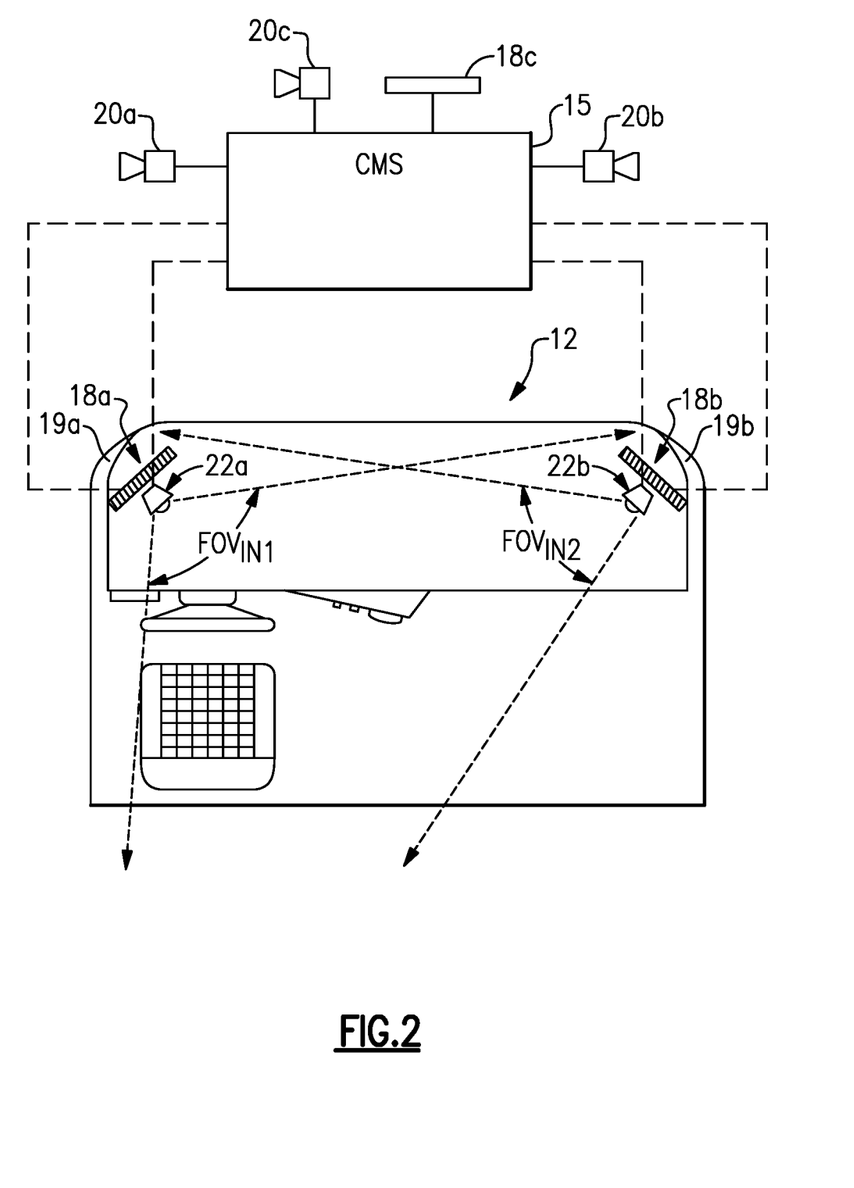
FIG. 2 is a schematic top perspective view of a vehicle cabin including displays and interior cameras.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the invention may also be applied to other types of vehicles. The vehicle 10 incorporates a camera mirror system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within camera arms. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. The class II view on a given side of the vehicle 10 is a subset of the class IV view of the same side of the vehicle 10. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of class VIII views is desired, camera housings can be disposed at the sides and rear of the vehicle 10 to provide fields of view including some or all of the class VIII zones of the vehicle 10. In such examples, the third display 18c can include one or more frames displaying the class VIII views. Alternatively, additional displays can be added near the first, second and third displays 18a, 18b, 18c and provide a display dedicated to providing a class VIII view.

Figure 3A:
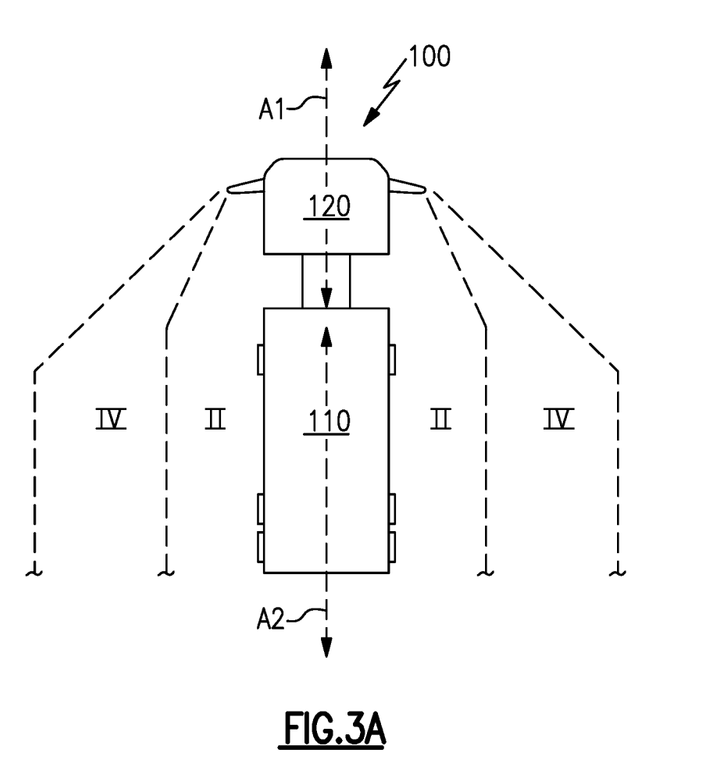
FIG. 3A illustrates a vehicle at the initiation of a reverse maneuver, with no trailer angle.
Figure 3B:
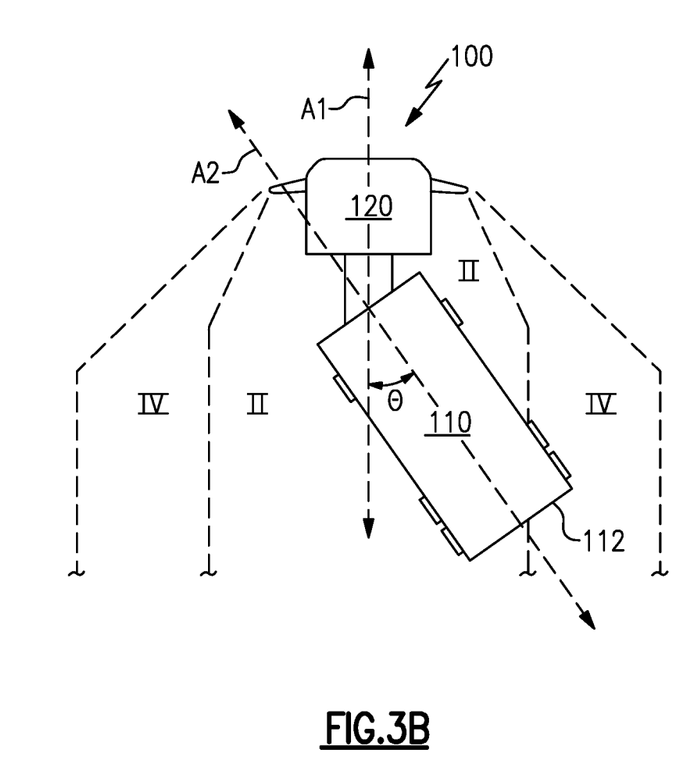
FIG. 3B illustrates the vehicle mid reversing maneuver, with a high trailer angle.

With continued reference to FIGS. 1A, 1B and 2, FIGS. 3A and 3B illustrate a vehicle 100 in the process of executing a reversing maneuver. In the initial position (FIG. 3A) the trailer 110 has an initial trailer angle of approximately zero degrees relative to the cab 120 (i.e., an angle between a central longitudinal axis A1 of the cab 120 and a central longitudinal axis A2 of the trailer 110), meaning that it is aligned with the orientation of the cab 120. This angle can alternatively be expressed as 180 degrees relative to the cab 120. During the process of reversing, and particularly when reversing through a turn, the trailer 110 skews relative the cab 120 (FIG. 3B) creating a trailer angle θ between the axes A1, A2 that impacts reversing maneuvers. The particular skew of FIG. 3B is exaggerated relative to most expected angles for the illustrative purposes.

In order to assist the driver in making the reversing maneuver, it is beneficial to ensure that the rear 112 of the trailer 110 is visible to the driver in at least one display through the reversing maneuver. In some particular examples, it is desirable to not only include the rear 112 of the trailer 110, but also to center the class II view on the rear 112 of the trailer 110. However, as illustrated in FIG. 3B, a static class II view can result in the rear 112 of the trailer 110 extending beyond the boundaries of the class II view even when the rear 112 remains within the Class IV field of view. In order to prevent loss of view of the rear 112 of the trailer 110 in the class II view, or to maintain centering of the class II view on the rear 112 of the trailer 110, the vehicle 10, 100 illustrated herein includes an auto-panning feature within the camera mirror system.

The auto-panning feature uses a combination of distinct trailer angle estimation and detection systems to estimate the trailer angle relative to the tractor at any given time. The estimated trailer angles are assigned a "weight" corresponding to how likely they are to be accurate given the current operating conditions and provided to a fusion system within the vehicle controller. By way of example, a wheel detection-based system may have a high probability of accuracy (greater than 90%) in daylight conditions, when the black wheel stands out against the surrounding environment, and a low probability of accuracy (50-70%) in night time conditions when the black wheel blends in with the dark environment. Similarly, a lane marker-based detection system, such as a straight-line detection system using Hough transforms, may have a lower probability of accuracy in obscured weather conditions (rain, snow, fog, etc.) and a higher probability of accuracy in clear weather conditions, and a bottom edge detection system may have a high probability of accuracy with a container trailer but a low probability of accuracy with a tanker trailer.

The vehicle controller fuses the multiple trailer angle estimates using a weighted sum based on the confidence value of each detection method. The weighted sum is referred to as a raw estimate. The raw estimate is then combined with historical estimates and filtered using a low pass filter to provide a smoothly transitioning trailer angle to the auto-panning feature in the CMS, as well as to any other vehicle systems that may benefit from utilizing the trailer angle estimate. In some examples, the camera mirror system can generate meta information corresponding to the sides of the trailer, and the meta information can be utilized to prevent false positives and/or otherwise provide additional confidence for determined trailer angles. In order to reduce phase lag, and thus reporting delay, when determining the trailer angle estimate to negligible levels the low pass filter starts at the first measurement. This reduces the phase lag by providing an initial assigned value. While some delay is still present in such a system, the delay is minimized so as not to impact the reversing system.

With continued reference to FIGS. 1-3B, FIG. 4 illustrates a process for determining a more accurate trailer angle. Initially, the process 300 determines angle estimates in a "Determine Angle Estimates" step 310. The number of angle estimates determined can vary depending on the particular system involved. In some examples, at least some of the angle estimates are purely vision based and utilize feature tracking of objects (e.g., wheels, rear edge, trailer markings, and the like) identified in the CMS video feeds to determine the estimated trailer angle. Similarly, some angle estimates can be determined based on deviation from road edge and/or lane detection, positioning satellite comparison to stored maps, hitch angle sensors, trailer edge detections, lane detectors, radar sensors, lidar sensors, and any other similar trailer angle detection systems.

Figure 4:
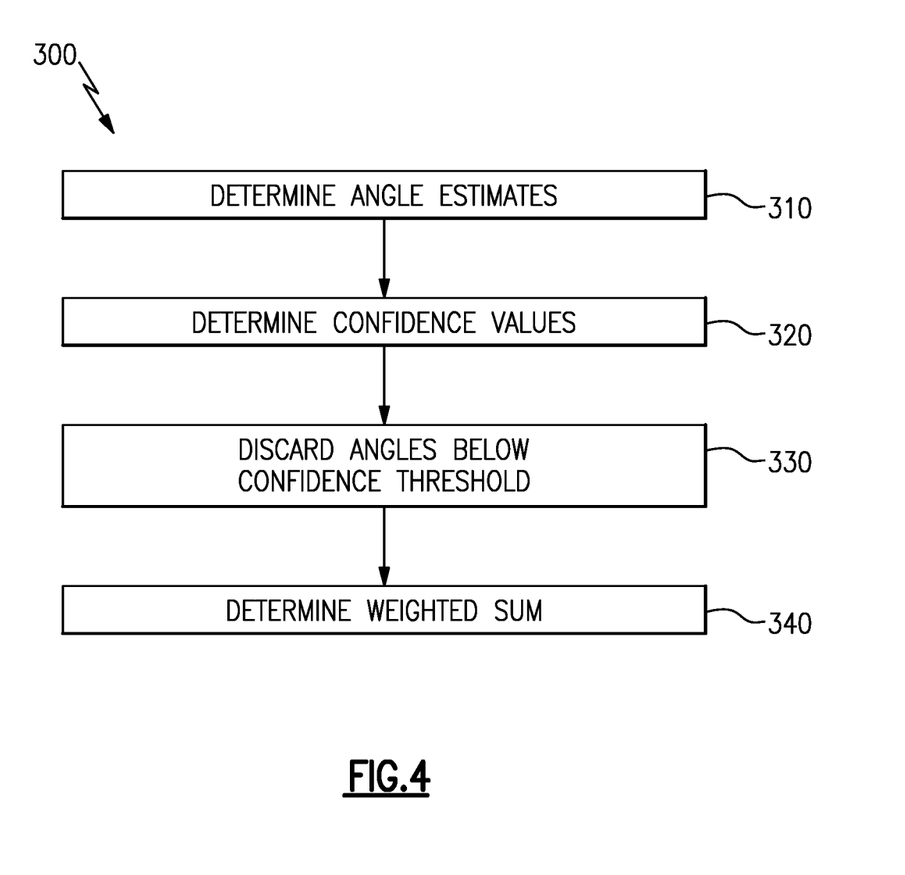
FIG. 4 illustrates a method for obtaining an estimated weighted trailer angle.

Once the trailer angle estimates are determined, the controller determining the trailer angle estimates assigns a confidence value to each trailer angle estimate in a "Determine Confidence Values" step 320. The methodology for determining the confidence of each estimation depends on how the particular estimation is performed, and can be determined by one of skill in the art using any appropriate technique. In some examples, the confidence values can be dependent on weather conditions, lighting conditions, trailer type, historical accuracy data, and any other features that may be relevant to a likelihood of accuracy. The confidence values are expressed as a percentage of accuracy (e.g. Wheel Based trailer angle of 15 degrees has a 94% chance of being accurate).

After determining the confidence values, the controller discards any estimates below a minimum confidence threshold in a "Discard Angles Below Confidence Threshold" step 330. In one example, estimates below an 85% confidence are assumed to be erroneous or otherwise inaccurate in some systems and are removed from consideration. In another example, estimates below a 90% confidence are assumed to be erroneous. Discarding estimates below the minimum confidence value threshold eliminates outliers that may occur due to inaccurate sensors, particularly bad conditions for a given estimation technique and any other similar conditions that result in inaccurate estimates. Elimination of extreme outliers increases the accuracy of the estimation. In some examples, where a significant number of estimates are provided to the controller and/or where a low confidence value is not indicative of an error, discarding the angles below the threshold can be omitted.

After all estimates below the threshold are discarded, or step 330 is bypassed, a fusion algorithm in the controller determines a weighted sum of the angle estimates in a "Determine Weighted Sum" step 340. In one example of the weighted average determination, a first trailer angle estimate of 14 degrees has a confidence of 98%, a second trailer angle estimate of 10 degrees has a confidence of 86%, and a third trailer angle estimate of 15 degrees has a confidence of 94%. The predefined threshold of confidence is set at 85%, and all three values are deemed to be acceptable. The fusion algorithm multiplies each angle by its corresponding confidence, sums the results, and divides the sum by a sum total of the confidence. In the exemplary case, the fusion algorithm results in the following: $((14*98)\pm(10*86)\pm(15*94))/(98+86+94)=13.10$ degrees. Thus, in the exemplary case, the determined angle (alternately referred to as a raw measurement) is 13.10 degrees and this angle is the output to a low-pass filter. The low pass filtered angle is output to the auto-panning system. It is appreciated that practical implementations can utilize substantially more than three angle estimates, and the more angle estimates that are used, the more accurate the resulting value will be.

Once the weighted average of the estimated angle has been determined, the controller adds the weighted average to a historical data set including previously determined weighted averages of the current operation. In one example, the trailer angle estimates are performed approximately every 200 ms, and the historical data set includes each subsequent entry in order. A low pass filter is applied to the historical data set, including the newly determined weighted average. The low pass filter smooths the transition and eliminates "jerky" or "abrupt" trailer angle transitions, providing a more accurate representation of the trailer angle change over time and allowing the auto-panning system and/or any other vehicle systems to account for accurate changes.

Figure 5:
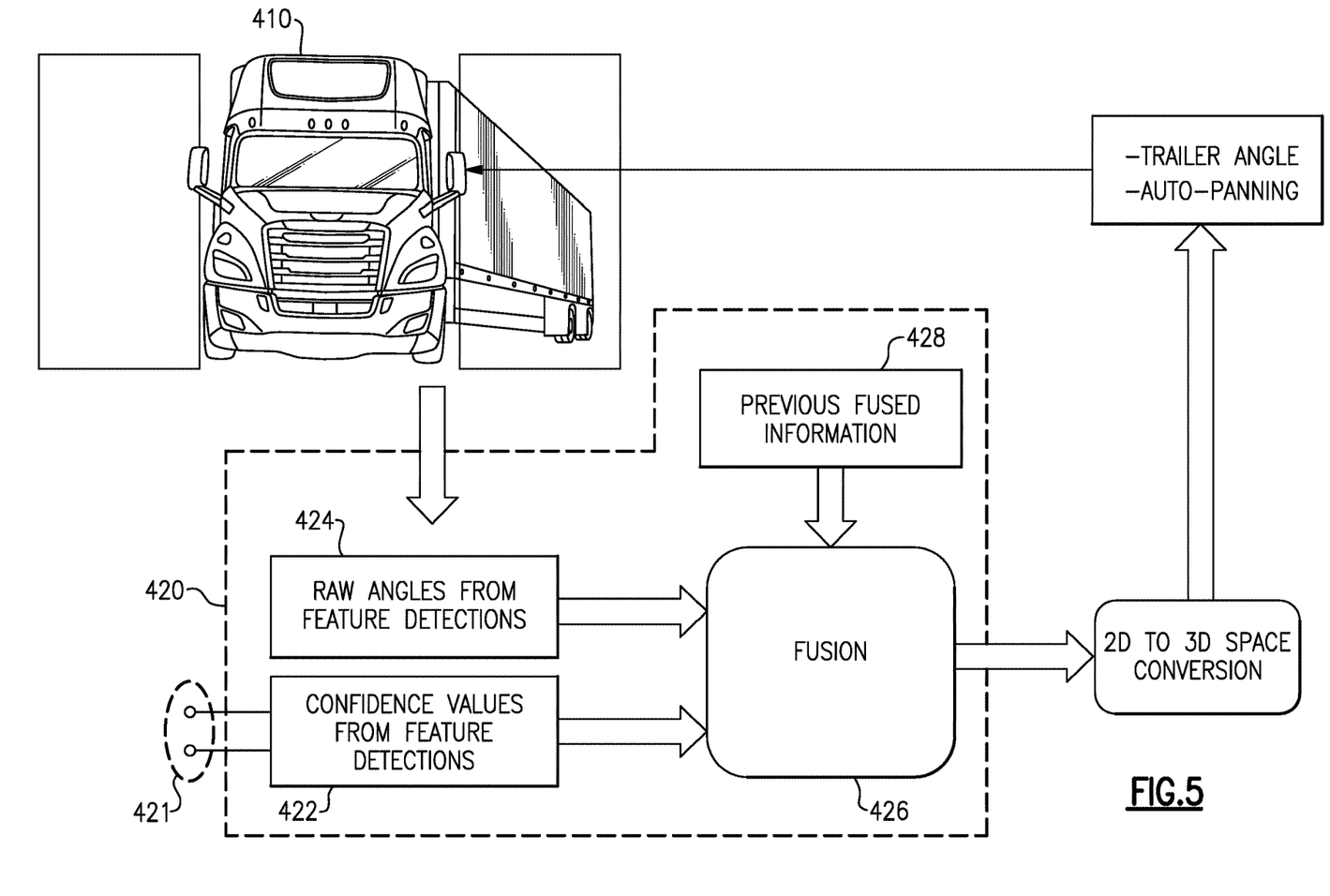
FIG. 5 illustrates a system for determining an accurate trailer angle from the estimated weighted angle, and automatically panning a camera mirror system.

With continued reference to FIG. 4, FIG. 5 schematically illustrates an example auto-panning system for a vehicle 410. A controller 420 receives images and other sensor information from the vehicle 410, and the controller 420 determines raw angle estimates from the received images and sensor information using an angle detection module 424. Alongside the angle detection module 424, a confidence value determination module 422 utilizes received data 421 indicative of conditions and any other aspects that impact the confidence of each detected angle. The confidence value determination module 422 determines the confidence of each trailer angle detection and the detections and confidence values are provided to a fusion module 426.

The fusion module 426 determines the weighted average of the estimated trailer angles and fuses the weighted average with the previous trailer angles, which is stored in a trailer angle history 428. The fusion module 426 also applies the low pass filter to the combined trailer angle and historical trailer angle data to determine a two-dimensional trailer angle. The two-dimensional trailer angle is the accurate estimate of the current trailer angle on a two-dimensional plane. The two-dimensional trailer angle is converted to a three-dimensional trailer position based on the trailer angle, and the geographical features (e.g. hill grade). The three-dimensional trailer angle is then provided to an auto-panning feature and the camera mirror system automatically pans at least one camera view within the image. In one example, the automatic panning is configured to ensure that the rear edge of the trailer is maintained within the class II view throughout operations of the vehicle. In other implementations, the automatic panning can maintain other objects or portions of objects in the view.

The fusion of the multiple estimate angles from different sources into a single, more reliable, trailer angle estimate that can be used across multiple systems. The fusion of multiple trailer angle estimations into a single value also allows for the system to account for unreliability of certain trailer angle estimation techniques for certain conditions and/or certain types of trailers while still reliably determining and panning for an accurate trailer angle.

Although an example embodiment has been disclosed, a worker of ordinary skill in this art would recognize that certain modifications would come within the scope of the claims. For that reason, the following claims should be studied to determine their true scope and content.

What is claimed is:

1. A method for automatically panning a view for a commercial vehicle comprising:
   determining a plurality of estimated trailer angles between a central longitudinal axis of a tractor and a central longitudinal axis of a trailer, each estimated trailer angle being determined using a distinct estimation method;
   assigning a confidence value to each estimated trailer angle in the plurality of estimated trailer angles;
   determining a weighted sum of the plurality of estimate trailer angles; and
   automatically panning a view of a camera mirror system on an electronic display based at least in part on the weighted sum and a current vehicle operation.

2. The method of claim 1, further comprising adding the determined weighted sum to an ordered list of historical weighted sums and low pass filtering the ordered list.

3. The method of claim 2, wherein automatically panning the view is based on the filtered ordered list.

4. The method of claim 1, further comprising discarding any estimated trailer angles with a confidence value below a predetermined threshold after assigning the confidence value to each estimate trailer angle and before determining the weighted sum.

5. The method of claim 4, wherein the predetermined threshold is at least 85%.

6. The method of claim 1, wherein the weighted sum is determined by multiplying each trailer angle estimate by the corresponding confidence value to determine weighted estimates, summing the weighted estimates, and dividing the summed weighted estimates by a sum of the confidence values.

7. The method of claim 1, wherein the distinct estimation methods include at least two of an image-based wheel detection, an image-based trailer rear edge angle detection, an image-based trailer marking angle detection, an image based wheel angle detection, a road edge deviation detection, a lane marker deviation detection, and a hitch angle sensor.

8. The method of claim 1, wherein automatically panning the view comprises adjusting a class II view within a class IV view.

9. The method of claim 8, wherein automatically panning the view comprises maintaining a rear edge of the trailer within the class II view.

10. The method of claim 1, further comprising continuously iterating the method, thereby generating real time trailer angle monitoring.

11. The method of claim 1, wherein determining the plurality of estimated trailer angles, assigning the confidence value to each estimated trailer angle in the plurality of estimated trailer angles, and determining a weighted average of the plurality of estimated trailer angles is performed within a camera mirror system controller of the vehicle.

12. The method of claim 1, wherein at least one of determining the plurality of estimated trailer angles, assigning the confidence value to each estimated trailer angle in the plurality of estimated trailer angles, and determining a weighted average of the plurality of estimated trailer angles is performed remote from a camera mirror system controller and transmitted to the camera mirror system controller.

13. A camera mirror system for a vehicle comprising;
   a first camera having a first field of view;
   a controller configured to receive the first field of view and output a subset of the first field of view to a first display;
   the controller including a trailer angle detection module configured to determine a plurality of trailer angle estimates for trailer angles between a central longitudinal axis of a tractor and a central longitudinal axis of a trailer, a confidence value module configured to determine a confidence value of each trailer angle estimate, and a fusion module configured to fuse the plurality of trailer angle estimates and the confidence values into a single trailer angle estimate; and
   automatically panning at least one view of the camera mirror system based at least in part on the single trailer angle estimate such that a feature of the trailer is maintained within the at least one view.

14. The camera mirror system of claim 13, wherein the fusion module is configured to determine a weighted sum trailer angle based on the plurality of trailer angle estimates and the corresponding confidence values.

15. The camera mirror system of claim 14, wherein the fusion module is further configured to add the weighted sum trailer angle to a historical weighted sum trailer angle data set and low pass filter the historical weighted sum trailer angle data set.

16. The camera mirror system of claim 13 wherein each trailer angle estimate in the plurality of trailer angle estimates is determined via a distinct angle estimation method.

17. The camera mirror system of claim 13, wherein the controller is further configured to add the single trailer estimate to an ordered list of historical trailer angle estimates and low pass filter the ordered list.

18. The camera mirror system of claim 17, wherein the automatic panning is based at least in part on the low pass filtered ordered list.

* * * * *